United States Patent
Niwa et al.

(10) Patent No.: US 9,368,256 B2
(45) Date of Patent: Jun. 14, 2016

(54) TUBULAR COVER

(71) Applicants: TOYOTA TSUSHO MATEX CORPORATION, Osaka-shi, Osaka (JP); ANDO CO., LTD., Sano-shi, Tochigi (JP)

(72) Inventors: Shu Niwa, Tokyo (JP); Shinichiro Ando, Sano (JP)

(73) Assignees: TOYOTA TSUSHO MATEX CORPORATION (JP); ANDO CO., LTD. (JP)

( * ) Notice: Subject to any disclaimer, the term of this patent is extended or adjusted under 35 U.S.C. 154(b) by 0 days.

(21) Appl. No.: 14/432,071

(22) PCT Filed: Sep. 26, 2013

(86) PCT No.: PCT/JP2013/076118
§ 371 (c)(1),
(2) Date: Mar. 27, 2015

(87) PCT Pub. No.: WO2014/050994
PCT Pub. Date: Apr. 3, 2014

(65) Prior Publication Data
US 2015/0287498 A1    Oct. 8, 2015

(30) Foreign Application Priority Data

Sep. 28, 2012 (JP) ................. 2012-217357

(51) Int. Cl.
*H02G 3/04* (2006.01)
*H01B 7/295* (2006.01)
(Continued)

(52) U.S. Cl.
CPC .................. *H01B 7/295* (2013.01); *D02G 3/28* (2013.01); *D03D 1/0035* (2013.01); *D03D 15/00* (2013.01); *D03D 15/04* (2013.01); *H01B 7/1865* (2013.01); *H02G 3/0481* (2013.01)

(58) Field of Classification Search
CPC ............. H02G 3/22; H02G 3/24; H02G 3/28; H02G 3/10; H01B 7/29; H01B 7/295; H01B 7/1865; D02G 3/28; D03D 15/00; D03D 27/00; D03D 27/02
USPC .......... 174/68.1, 68.3, 135, 72 A, 88 R, 70 C, 174/95; 248/49, 68.1; 138/118.1, 118, 111, 138/110
See application file for complete search history.

(56) References Cited

U.S. PATENT DOCUMENTS 4,460,803 A * 7/1984 Piper ..................... H01B 7/083
174/36
4,626,458 A * 12/1986 Pithouse ............ H02G 15/1806
174/92

(Continued)

FOREIGN PATENT DOCUMENTS

JP        S62-45752 A       2/1987
JP        2003-506579 A     2/2003
(Continued)

*Primary Examiner* — Angel R Estrada
(74) *Attorney, Agent, or Firm* — Harness, Dickey & Pierce, P.L.C.

(57) ABSTRACT

A tubular cover is obtained by causing a fabric woven from a warp and weft to be imparted with a curl by a heat treatment, wherein the tubular cover is characterized in that the warp and/or the weft are folded yarns created by twisting together multiple strands of yarn that have already been twisted in either an S- or Z-winding-direction, the winding direction of the twisting when the folded yarn is created being the opposite of the yarn-winding direction.

4 Claims, 5 Drawing Sheets

(51) Int. Cl.
*D02G 3/28* (2006.01)
*D03D 15/04* (2006.01)
*D03D 1/00* (2006.01)
*D03D 15/00* (2006.01)
*H01B 7/18* (2006.01)

(56) References Cited

U.S. PATENT DOCUMENTS 4,900,596 A * 2/1990 Peacock .............. B29C 66/4722
   138/110
4,940,820 A * 7/1990 Pithouse ............ H02G 15/1806
   174/DIG. 8
6,005,191 A * 12/1999 Tzeng .................... H01B 11/10
   174/36
2008/0135119 A1    6/2008 Tonooka et al.

FOREIGN PATENT DOCUMENTS

| JP | 2010-512466 A | 4/2010 |
| WO | WO-01-09417 A1 | 2/2001 |
| WO | WO-2008-070819 A2 | 6/2008 |

* cited by examiner (a)

0101

(b)

0102

(a)

0501

(b)

0502

TUBULAR COVER

CROSS-REFERENCE TO RELATED APPLICATIONS

This application is a 371 U.S. National Stage Application of International Application No. PCT/JP2013/076118 filed on Sep. 26, 2013, and published in Japanese as WO 2014/050994A1 on Apr. 3, 2014. This application claims priority to Japanese Application No. 2012-217357 filed on Sep. 28, 2012. The entire disclosures of the above applications are incorporated herein by reference.

TECHNICAL FIELD

The present invention relates to a tubular cover used for accommodating wires or the like.

BACKGROUND ART

Conventionally, a plurality of wires for power supply or signal communication is connected to a machine device. However, if these wires are loose, it is difficult to handle them, and rubbing between the wires caused by vibration or the like increases degrees of exhaustion and deterioration.

Thus, a tubular cover which bundles these plurality of wires together so as to realize easy handling and to suppress rubbing between the wires and moreover capable of playing a role of a protective member for the wires by using a fire-retardant material, for example, is provided.

This tubular cover is formed by applying heat treatment to a planar textile fabric woven by a warp and a weft, for example, and by imparting a curl so that the fabric becomes cylindrical. When the wires are to be accommodated inside the tubular cover, the fabric is extended in a direction opposite to the curl and opened, and the wires are attached inside through the opening.

SUMMARY OF INVENTION

Technical Problem

The yarn constituting the fabric of the above-described tubular cover shrinks by the heat treatment in curl treatment or the like, but the warp is caused to twist during the shrinking, and sides of the opening are slanted, and the side (0501) of the opening of the tubular cover spirally serpentines as illustrated in FIG. 5(*a*). Then, as illustrated in FIG. 5(*b*), such a problem arises that a longitudinal direction of the linear wires (0502) does not become parallel with an opening direction of the opening when the wires are accommodated in the tubular cover, and the serpentine part becomes an obstruction and makes attachment of the wires difficult.

Solution to Problem

In order to solve the above-described problem, the present invention provides a tubular cover characterized by having a structure in which the warp does not twist even in heat shrink by adjusting a twisting direction of the yarn so that linearity of a side of an opening can be maintained.

Specifically, a tubular cover obtained by curling a fabric woven by a warp and a weft through heat treatment is provided, characterized in that the warp and/or the weft is a folded yarn produced by further twisting a plurality of yarns twisted in either one of an S- and a Z-winding directions, and a winding direction of twisting in producing the folded yarn is a direction opposite to the yarn winding direction.

Moreover, in the tubular cover provided with the above-described configuration, a tubular cover is also provided, characterized in that a ratio of a twisting rotation number of the yarn per predetermined unit length to a twisting rotation number of the folded yarn is 3:10.

Moreover, a manufacturing method of such a tubular cover is also provided. Specifically, a manufacturing method of a tubular cover is provided, having a yarn producing process for producing a yarn twisted in either one of an S- and a Z-winding directions, a folded yarn producing process for producing a folded yarn by twisting a plurality of the produced yarns in a direction opposite to the yarn winding direction, a fabric weaving process for weaving a fabric by using the produced folded yarn as a warp and/or a weft, and a curling process for curling the woven fabric by heat treatment so as to form a tubular cover.

Moreover, in a manufacturing method of the tubular cover with the processes as described above, a manufacturing method of a tubular cover is provided, characterized in that a ratio of a twisting rotation number of the yarn per predetermined unit length in the yarn producing process to a twisting rotation number of the folded yarn per predetermined unit length in the folded yarn producing process is 3:10.

Advantageous Effects of Invention

By means of the present invention having the above-described configuration, a degree of twist in a warp which is a folded yarn during heat shrinking can be suppressed by twisting of two in opposite directions, and linearity of the sides of the opening of the tubular cover can be maintained.

Therefore, the longitudinal direction of the wires and the opening direction of itself can be made parallel with each other in attachment of the wires, and the wires can be accommodated into the tubular cover easily.

DESCRIPTION OF EMBODIMENTS

An embodiment of the present invention will be described below by using the attached drawings. The present invention is not limited to the embodiment and can be put into practice in various modes within a range not departing from its gist.

An embodiment 1 will be described mainly for aspects 1 to 4 of the present disclosure.

Embodiment 1

Outline

Figure 1:
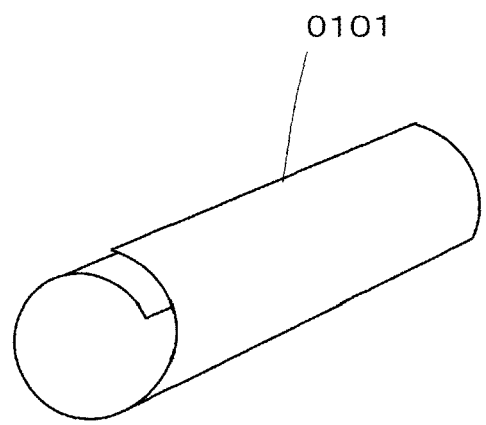
FIGS. 1(*a*) and (*b*) are schematic views illustrating an example of wire accommodation by a tubular cover in an embodiment 1.
Figure 1:
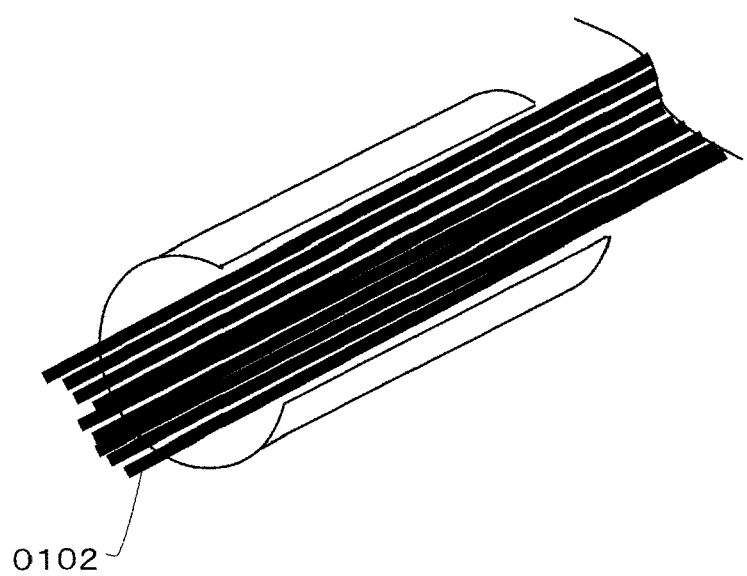

FIG. 1 are schematic views illustrating an example of wire accommodation by a tubular cover of this embodiment.

As illustrated in this FIG. 1(*a*), the tubular cover of this embodiment has linearity of a side (0101) of its opening maintained and thus, the side of the opening is in parallel with a longitudinal direction of wires and therefore, as illustrated in FIG. 1(*b*), the curled tubular cover can be opened so that the wires (0102) such as various cables can be attached therein easily and is characterized by high attachment work efficiency when the wires are covered by the tubular cover.

Structure

Figure 2:
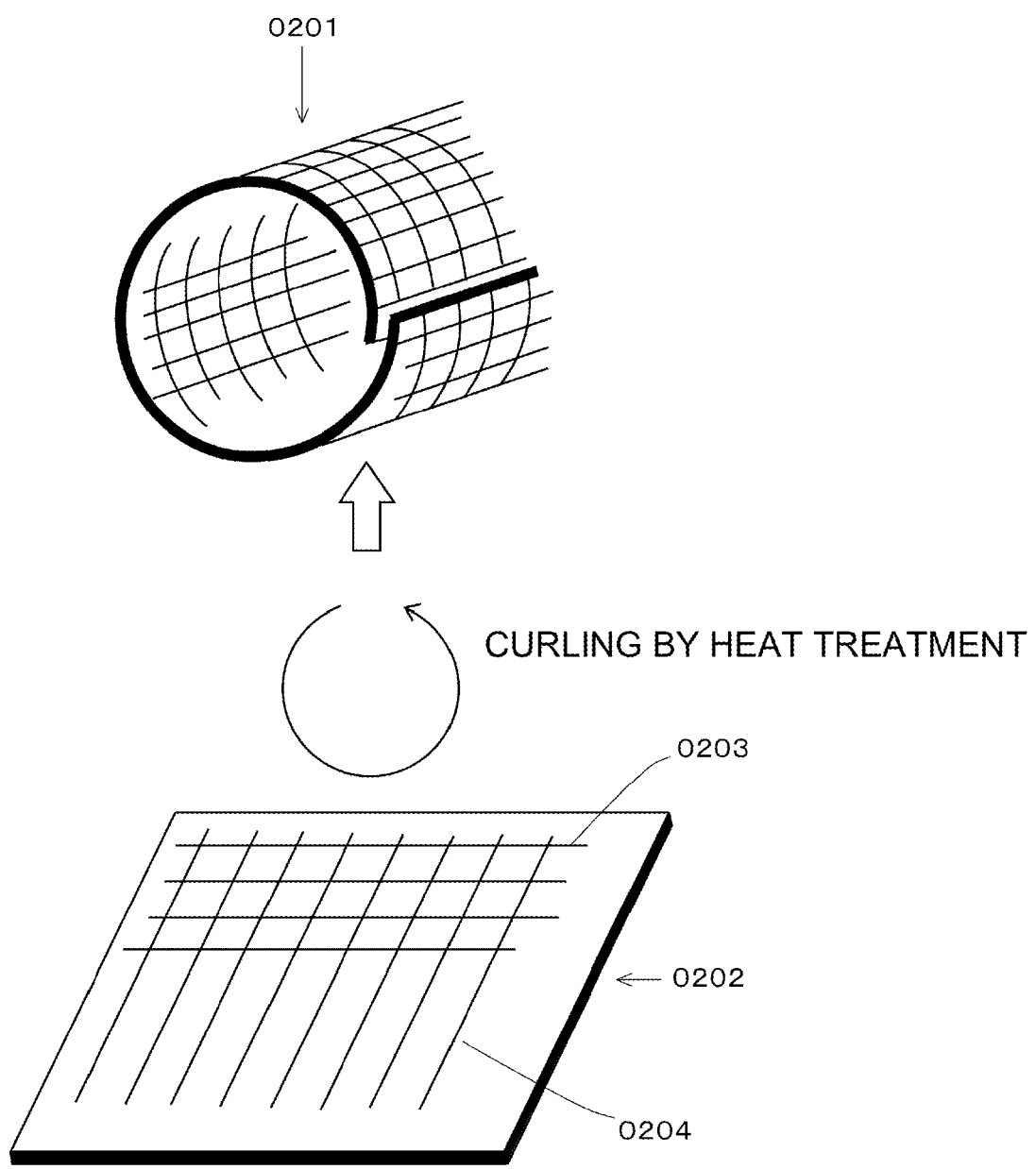
FIG. 2 is a schematic view illustrating an example of a structure in the tubular cover in the embodiment 1.

FIG. 2 is a schematic view illustrating an example of a structure in the tubular cover in this embodiment. As illustrated in this figure, the "tubular cover" (0201) of this embodiment is characterized by being formed by curling a fabric (0202) through heat treatment. This fabric is woven by a "warp" (0203) and a "weft" (0204).

Figure 3:
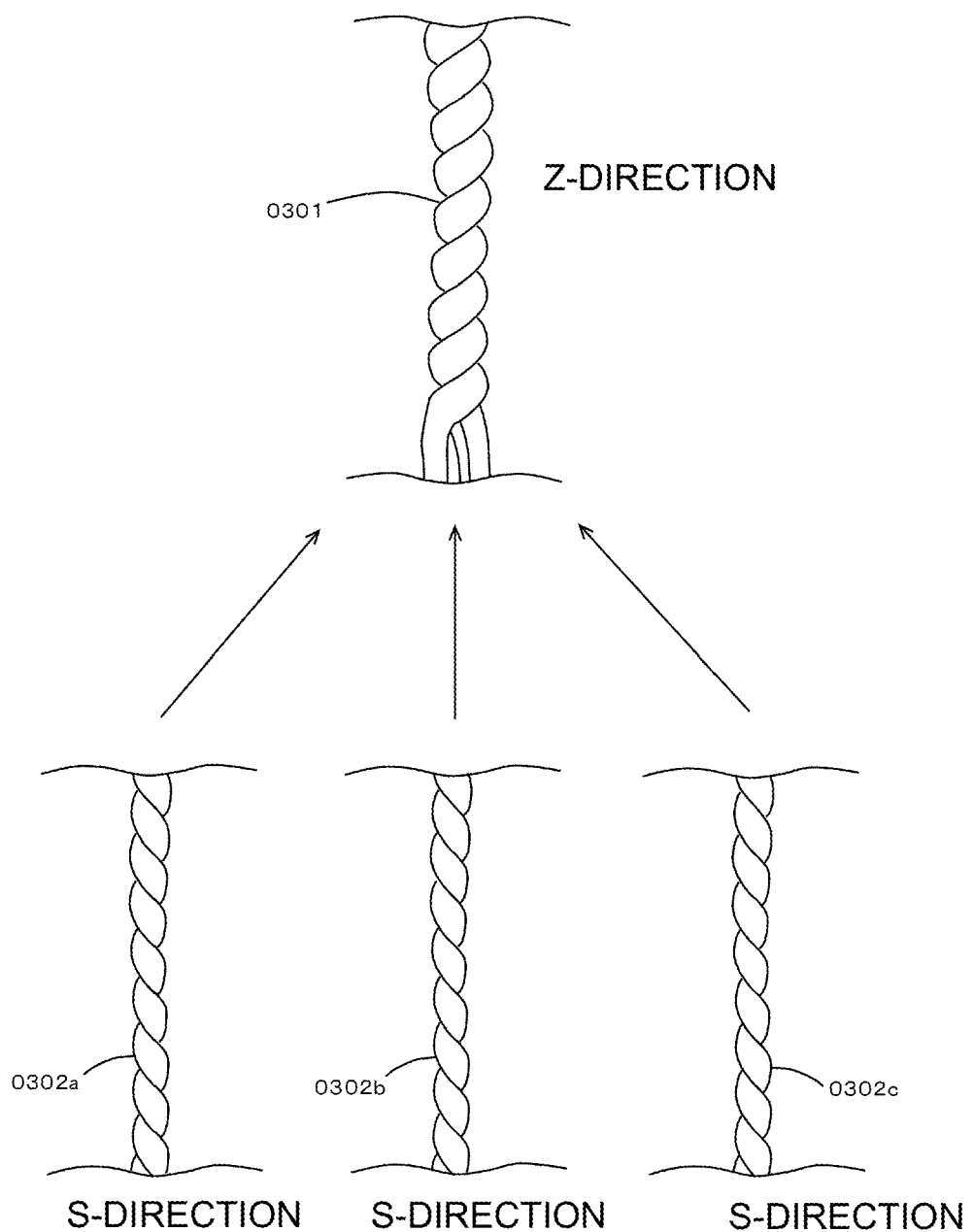
FIG. 3 is a schematic view for explaining an example of a structure of a warp and/or a weft constituting a fabric of the tubular cover in the embodiment 1.

FIG. 3 is a schematic view for explaining an example of the structure of the warp and/or the weft constituting this fabric. As illustrated in this FIG. 3, the "warp (and/or the weft)" (0301) constituting the fabric of the tubular cover is a "folded yarn" produced by twisting a plurality of "yarns" (0302*a* to 0302*c*). Moreover, a plurality of yarns constituting the folded yarn is also formed by twisting a single yarn or a plurality of yarns.

As illustrated in this FIG. 3, twisting directions of the yarns are aligned in one direction of S or Z. If the twisting of the plurality of yarns is in the S-direction, the folded yarn is produced by twisting the plurality of yarns in the Z-direction, while if the twisting of the plurality of yarns is in the Z-direction, the folded yarn is produced by twisting the plurality of yarns in the S-direction. That is, the winding direction of twisting of a plurality of yarns when the folded yarn is to be produced is characterized by being a direction opposite to the winding direction of the plurality of yarns.

If either one of the warp and the weft is to be a folded yarn, the yarn to be the folded yarn is a warp or a weft to be a warp which is a yarn to be arranged in parallel with a curl direction in the subsequent curling process.

As described above, regarding the tubular cover of this embodiment, by twisting a plurality of yarns twisted in the S-direction in the Z-direction this time into the folded yarn and by using it as the warp, for example, the twisting in the twisting direction by heat shrink is offset, and a curl can be realized in an ideal state without twist.

Moreover, by setting a ratio of a twisting rotation number of the plurality of yarns per predetermined length unit to a twisting rotation number of the folded yarn to 3:10, the twisting of the fabric is suppressed, and the curl can be realized in a more ideal state. Specifically, if a thickness of the warp in a curl direction is 1800 d (denier), six yarns each having the thickness of 300 d and twisted by 12 rotations/m (12 rotations per meter) in the Z-direction are prepared and they are twisted in the S-direction this time at a rate of 40 rotations/m so as to have a folded yarn with the thickness of 1800 d (denier).

Regarding the fabric woven by utilizing such a folded yarn as the warp, each yarn shrinks in the Z-direction through heat treatment during curling and the like, while the entire folded yarn shrinks in the S-direction and thus, the shrink is offset, and a tubular cover formed by an ideal fabric without twist can be obtained.

The plurality of yarns constituting the folded yarn may be a twisted single yarn or this yarn itself may be formed by twisting a plurality of yarns. A material of this yarn is not particularly limited, and synthetic fibers such as aramid fibers, vinylon fibers, polyethylene fibers, acryl fibers, PET (polyethylene terephthalate) fibers, polyurethane fibers, fluorine resin fibers and the like and carbon fibers can be included, for example. The yarn may also be resin fibers originating from plants.

Moreover, fire resistance or abrasion resistance of the tubular cover itself may be improved by forming these fibers of fire-retardant fibers or abrasion-resistant fibers.

Such tubular covers can be used for wire accommodation in an automobile, for example.

Manufacturing Process

Figure 4:
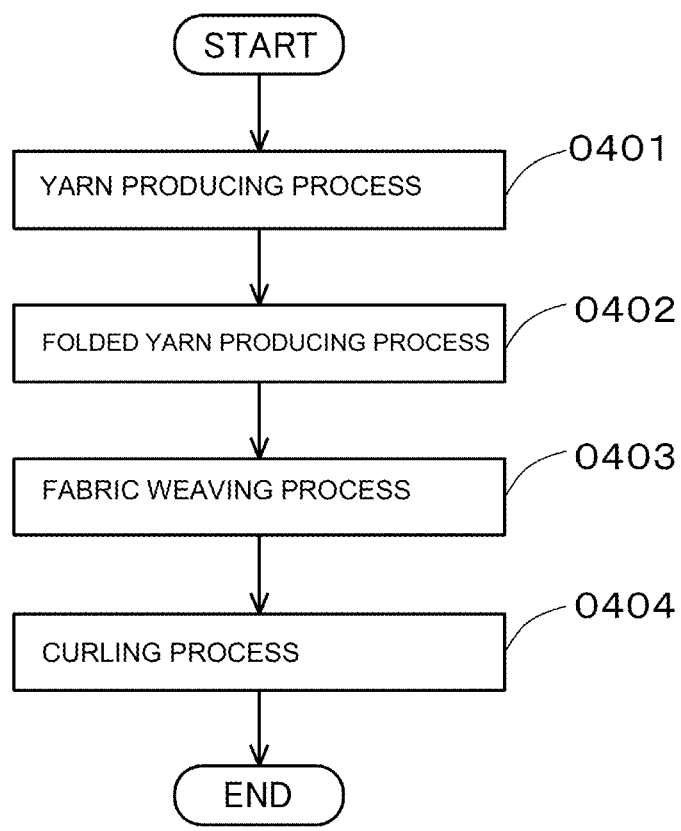
FIG. 4 is a diagram illustrating an example of a manufacturing process relating to the tubular cover in the embodiment 1.
Figure 5:
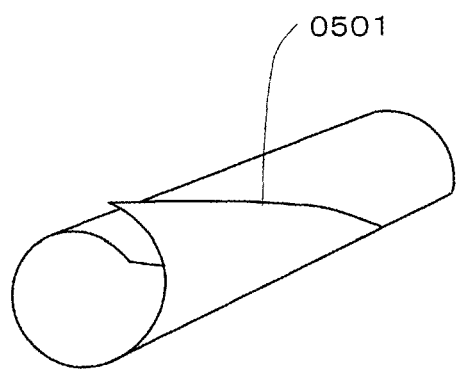
FIGS. 5(*a*) and (*b*) are schematic views illustrating an example of wire accommodation by a prior-art tubular cover.
Figure 5:
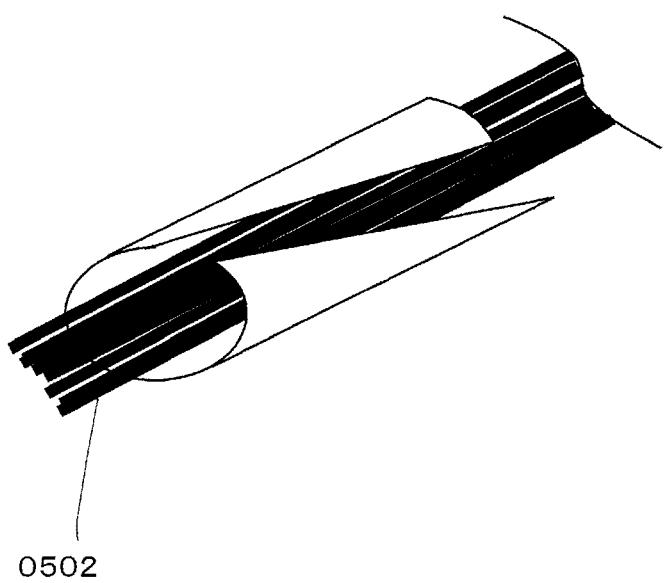

FIG. 4 is a diagram illustrating an example of a manufacturing process relating to the tubular cover of this embodiment. As illustrated in this figure, the manufacturing process for the tubular cover of this embodiment is composed of a "yarn producing process" (0401), a "folded yarn producing process" (0402), a "fabric weaving process" (0403), and a "curling process" (0404).

The "yarn producing process" (0401) is a process for producing a plurality of yarns twisted in either one of the S- and Z-winding directions. Specifically, a yarn wound around a bobbin or the like is fed out to a yarn twisting machine, and the yarn is twisted by a rotation mechanism in the yarn twisting machine, for example.

The plurality of yarns produced here and used in the subsequent folded yarn producing process is preferably all twisted in an aligned state in either one of the S- and the Z-directions in principle.

The "folded yarn producing process" (0402) is a process for producing a folded yarn by twisting the produced plurality of yarns in the direction opposite to the winding direction of the yarn. Specifically, while the produced plurality of yarns are aligned by a guide mechanism or the like, the plurality of yarns are fed out to a yarn folding machine at the same time and these plurality of yarns are twisted in the rotation mechanism in the yarn folding machine.

This folded yarn producing process is characterized in that a rotation direction of the rotation mechanism in the yarn folding machine is controlled to be opposite to the winding direction in the yarn twisting machine in the yarn producing process.

Moreover, by setting the ratio of the twisting rotation number of a plurality of the yarn per predetermined length unit in the yarn producing process to the twisting rotation number of the folded yarn in the folded yarn producing process to 3:10, twist of the fabric is suppressed, and curl can be realized in a more ideal state. Specifically, as described above, if the thickness of the warp in the curl direction is 1800 d (denier), for example, six yarns each having the thickness of 300 d and twisted by 12 rotations/m (12 rotations per meter) in the Z-direction are prepared and they are twisted in the S-direction this time at a rate of 40 rotations/m so as to have a folded yarn with the thickness of 1800 d (denier).

The "fabric weaving process" (0403) is a process for weaving a fabric utilizing various weaving machines such as a needle loom with the folded yarn produced in the folded yarn producing process as at least either one of a warp and a weft. If either one of the warp and the weft is used as a folded yarn, the yarn to be a folded yarn shall be a warp or a weft which should be a warp which is a yarn to be arranged in parallel with the curl direction in the subsequent curling process.

The "curling process" (0503) is a process for curling the fabric woven in the fabric weaving process through heat treatment by a heat processing apparatus or the like so as to form it into a tubular shape or to make it become tubular easily.

Specifically, a flat-plate shaped fabric woven in the fabric weaving process is rolled (curled) by being passed through a plurality of plates having circular holes open, for example, and is inserted into a heater apparatus for sintering (heat treatment) in the curled state. It is preferably configured such that a cylindrical core rod is provided in the heater apparatus, and the curled fabric is subjected to sintering processing in a state in which its inner diameter is held by the core rod. Then, by inserting the fabric into a cooling apparatus after the sintering processing, the fabric is brought into a state fixed to a curl shape or to become curled easily (shape memory state).

The folded yarn thermally shrinks by heat treatment at this time, but since the folded yarn as a whole shrinks in the S-direction while the plurality of yarns constituting the folded yarn shrinks in the Z-direction, for example, the shrink is offset and the twist is reduced, whereby linearity of the side of the opening can be maintained.

Subsequently, the curled fabric is cut in a longitudinal direction by means of a cutting apparatus or the like in accordance with various use applications of a user such as a length of a bundle of wires. Then, the cut fabric of the tubular cover is expanded in the direction opposite to the curl and opened, and the wires are attached inside through the opening. At this time, since linearity of the side of the opening is maintained, the longitudinal direction of the wires can be made parallel with the side direction of the opening, and the wires can be accommodated into the tubular cover easily.

Brief Description of Effects

As described above, in the tubular cover of this embodiment, a degree of twist caused by heat shrink of the warp which is a folded yarn can be suppressed by two twisting in opposite directions, and linearity of the side of the opening of the tubular cover can be maintained.

Therefore, in attachment of the wires, the longitudinal direction of the wires and the opening direction of itself can be made parallel with each other, and the wires can be accommodated into the tubular cover easily.

The invention claimed is:

1. A tubular cover obtained by curling a fabric woven by a warp and a weft through heat treatment, wherein
   each of the warp and the weft is a folded yarn produced by twisting a plurality of yarns, each of the plurality of yarns is twisted in one of S-winding and Z-winding directions, and
   a twisting direction of the plurality of yarns for producing the folded yarn is the other of the S-winding and Z-winding directions.

2. The tubular cover according to claim 1, wherein
   a ratio of a twisting rotation number of each of the plurality of yarns per predetermined unit length to a twisting rotation number of the folded yarn is 3:10.

3. A manufacturing method of a tubular cover, comprising:
   producing a plurality of yarns, each of the plurality of yarns being twisted in one of S-winding and Z-winding directions;
   producing a folded yarn by twisting the plurality of yarns in the other of the S-winding and Z-winding directions;
   weaving a fabric by using the folded yarn as a warp and a weft; and
   curling the fabric by heat treatment so as to form the tubular cover.

4. The manufacturing method of a tubular cover according to claim 3, wherein
   a ratio of a twisting rotation number of each of the plurality of yarns per predetermined unit length to a twisting rotation number of the folded yarn per predetermined unit length is 3:10.

* * * * *